(12) United States Patent
Zhou et al.

(10) Patent No.: US 10,798,772 B2
(45) Date of Patent: Oct. 6, 2020

(54) METHOD, DEVICE AND MEDIUM FOR ESTABLISHING SERVICE CONNECTION

(71) Applicant: Beijing Xiaomi Mobile Software Co., Ltd., Haidian District, Beijing (CN)

(72) Inventors: Juejia Zhou, Beijing (CN); Weiyan Ge, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 198 days.

(21) Appl. No.: 15/980,766

(22) Filed: May 16, 2018

(65) Prior Publication Data
US 2018/0263073 A1  Sep. 13, 2018

Related U.S. Application Data

(63) Continuation-in-part of application No. PCT/CN2016/093020, filed on Aug. 3, 2016.

(51) Int. Cl.
*H04W 76/25* (2018.01)
*H04W 76/36* (2018.01)
(Continued)

(52) U.S. Cl.
CPC ....... *H04W 76/25* (2018.02); *H04M 3/42187* (2013.01); *H04W 76/15* (2018.02);
(Continued)

(58) Field of Classification Search
None
See application file for complete search history.

(56) References Cited

U.S. PATENT DOCUMENTS 6,594,277 B1 * 7/2003 Chiang ............ H04L 47/10
370/230
2002/0144007 A1 * 10/2002 Shteyn ............ G06Q 30/02
719/313
(Continued)

FOREIGN PATENT DOCUMENTS

CN 101083615 A 12/2007
CN 101237626 A 8/2008
(Continued)

OTHER PUBLICATIONS

KT, "CS/PS Mode 1 enhancement to improve CSFB voice services", 3GPP Draft; R2-115733 CS-PS Model Enhancement, 3rd Generation Partnership Project (3GPP), Mobile Competence Centre; 650, Route Des Lucioles; F-06921 Sophia-Antipolis Cedex; France, vol. RAN WG2, No. San Francisco (CA), USA; Nov. 14, 2011-Nov. 18, 2011, Nov. 7, 2011, XP050564142.
(Continued)

*Primary Examiner* — Hassan A Phillips
*Assistant Examiner* — Gautam Sharma
(74) *Attorney, Agent, or Firm* — Jun He Law Offices P.C.; James J. Zhu

(57) ABSTRACT

A method, device and medium for establishing service connection are provided. The method includes: when a first-type service connection has been established, receiving a connection request message sent from a network device, the connection request message at least carrying the second-type service connection; and determining whether to establish the second-type service connection with the network device according to the first-type service connection and the second-type service connection, and responding according to the determination result.

17 Claims, 3 Drawing Sheets

---

101 — when a first-type service connection has been established, receiving a connection request message from a network device 102 — determining whether to establish the second-type service connection with the network device according to the first-type service connection and the second-type service connection, and responding according to the determination result

(51) Int. Cl.
*H04W 76/34* (2018.01)
*H04W 76/15* (2018.01)
*H04W 76/18* (2018.01)
*H04M 3/42* (2006.01)
*H04W 4/70* (2018.01)
*H04W 68/00* (2009.01)

(52) U.S. Cl.
CPC .......... *H04W 76/18* (2018.02); *H04W 76/34* (2018.02); *H04W 76/36* (2018.02); *H04W 4/70* (2018.02); *H04W 68/005* (2013.01)

(56) References Cited

U.S. PATENT DOCUMENTS

| | | | | |
|---|---|---|---|---|
| 2006/0189331 | A1* | 8/2006 | Lundsjo | H04W 68/12 455/435.2 |
| 2007/0141984 | A1* | 6/2007 | Kuehnel | H04W 4/80 455/41.2 |
| 2007/0171879 | A1* | 7/2007 | Bourque | H04W 76/11 370/338 |
| 2007/0232276 | A1* | 10/2007 | Andersson | H04W 28/24 455/414.1 |
| 2007/0273749 | A1 | 11/2007 | Fujii et al. | |
| 2007/0280251 | A1 | 12/2007 | Wang et al. | |
| 2008/0062934 | A1* | 3/2008 | Zhao | H04W 76/10 370/332 |
| 2011/0217969 | A1 | 9/2011 | Spartz et al. | |
| 2013/0060954 | A1* | 3/2013 | Dahlqvist | H04L 65/1016 709/228 |
| 2014/0089478 | A1* | 3/2014 | Seed | H04L 41/0273 709/222 |
| 2014/0140287 | A1 | 5/2014 | Cheng | |
| 2014/0364118 | A1 | 12/2014 | Belghoul et al. | |
| 2016/0029222 | A1 | 1/2016 | Su et al. | |
| 2017/0367036 | A1* | 12/2017 | Chen | H04L 43/08 |
| 2018/0220477 | A1* | 8/2018 | Tabourin | H04W 76/12 |

FOREIGN PATENT DOCUMENTS

| | | |
|---|---|---|
| CN | 102550104 A | 7/2012 |
| CN | 102781046 A | 11/2012 |
| JP | 2001-103551 A | 4/2001 |
| JP | 2007-318681 A | 12/2007 |
| RU | 2369011 C2 | 9/2009 |
| RU | 2480934 C2 | 4/2013 |
| WO | 2016014315 A1 | 1/2016 |

OTHER PUBLICATIONS

Samsung, "Layer 2 design to support multiple service verticals", 3GPP Draft; R2-163802, 3rd Generation Partnership Project (3GPP), Mobile Competence Centre; 650, Route Des Lucioles; F-06921 Sophia-Antipolis Cedex; France, vol. RAN WG2 No. Nanjing, China; May 23, 2016-May 27, 2016, May 13, 2016, XP051095672, Retrieved from the Internet: URL: http://www.3gpp.org/ftp/tsg_ran/WG2_RL2/TSGR2_94/Docs/, retrived on May 13, 2016.

"3rd Generation Partnership Project; Technical Specification Group Services and System Aspects; Circuit Switched Fallback in Evolved Packet System; Stage 2 (Release 9)", 3GPP Standard; 3GPP TS 23.272, 3rd Generation Partnership Project (3GPP), Mobile Competence Centre; 650, Route Des Lucioles; F-06921 Sophia-Antipolis Cedex; France, No. V.9.2.0, Dec. 10, 2009, pp. 1-64, XP050400606.

Extended European Search Report for European Application 17164924.7, dated Nov. 27, 2017.

International Search Report for International Application PCT/CN2016/093020, dated Apr. 26, 2017.

The Office Action in Japanese application No. 2017-511773, dated Aug. 21, 2018.

The Office Action of Indian Patent Application No. 201737006658, dated Feb. 26, 2020.

\* cited by examiner

METHOD, DEVICE AND MEDIUM FOR ESTABLISHING SERVICE CONNECTION

CROSS-REFERENCE TO RELATED APPLICATIONS

This application is a continuation-in-part application of PCT Patent Application No. PCT/CN2016/093020, filed on Aug. 3, 2016, the entire contents thereof are incorporated herein by reference.

TECHNICAL FIELD

The present disclosure generally relates to the field of communication technology, and more particularly, to a method, device and medium for establishing service connection.

BACKGROUND

With the wireless communication technology gradually evolving from 2G, 3G, 4G to 5G, demands of users also increase, and diversity of services has become more concerned by users. In order to meet the needs of users, the current communication technology has achieved flexible configuration and diverse services, and can allow multiple types of service to be handled for users.

In practice, since a User Equipment cannot handle multiple services at the same time, when the User Equipment is in an idle state, if a connection request message sent by a network device is received, a corresponding service connection is established and the service is handled by the user. However, when the User Equipment has established the service connection, it will be in a busy state. If another connection request message sent by the network device is received at this time, the User Equipment will send a connection rejection message to the network device. That is, the User Equipment will maintain the established service connection and reject a new service connection and do not handle other service for the user.

SUMMARY

According to a first aspect of embodiments of the present disclosure, there is provided a method for establishing service connection, and the method includes: when a first-type service connection has been established, receiving a connection request message sent from a network device, the connection request message carrying a second-type service connection; determining whether to establish the second-type service connection with the network device according to the first-type service connection and the second-type service connection; and responding according to the determination result.

According to a second aspect of embodiments of the present disclosure, there is provided a device for establishing service connection, and the device includes: a processor; and a memory for storing instructions executable by the processor; wherein the processor is configured to perform: when a first-type service connection has been established, receiving a connection request message sent from a network device, the connection request message carrying a second-type service connection; determining whether to establish the second-type service connection with the network device according to the first-type service connection and the second-type service connection; and responding according to the determination result.

According to a third aspect of embodiments of the present disclosure, there is provided a non-transitory computer-readable storage medium storing instructions, executable by a processor in a device, for performing a method for establishing service connection, and the method includes: when a first-type service connection has been established, receiving a connection request message sent from a network device, the connection request message carrying a second-type service connection; determining whether to establish the second-type service connection with the network device according to the first-type service connection and the second-type service connection; and responding according to the determination result.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the embodiments and the accompanying drawings. Here, the illustrative embodiments of the present disclosure and the description thereof are not intended to limit the present disclosure, but to explain the present disclosure.

Embodiments of the present disclosure provide a method, device and medium for establishing service connection, which will be described in detail with reference to the accompanying drawings.

Figure 1:
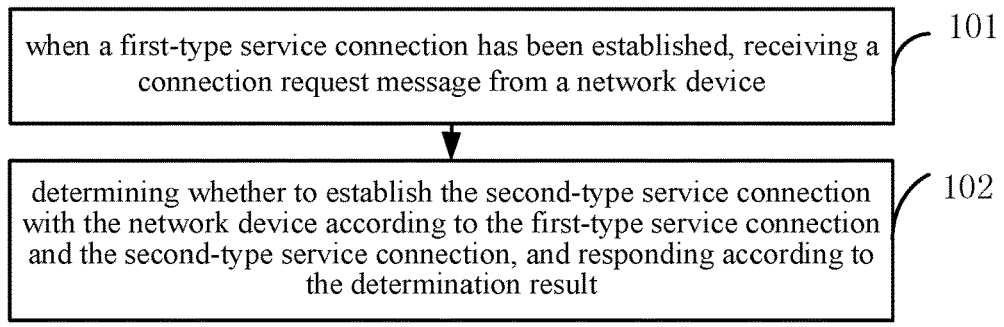
FIG. 1 is a flow chart illustrating a method for establishing service connection according to an exemplary embodiment.

FIG. 1 is a flow chart illustrating a method for establishing service connection according to an exemplary embodiment. As shown in FIG. 1, the method for establishing service connection is applied in a User Equipment and includes the following steps.

In step 101, when a first-type service connection has been established, a connection request message sent from a network device is received, and the connection request message carries a second-type service connection.

In step 102, it is determined whether to establish the second-type service connection with the network device according to the first-type service connection and the second-type service connection, and the connection request message is responded according to the determination result.

In the method provided by the embodiment of the present disclosure, by carrying a service type in the connection request message, if a connection request message carrying the second-type service connection is received when a first-type service connection has been already established, it is determined whether to establish the second-type service connection with the network device according to the first-type service connection and the second-type service connection, and the connection request message is responded according to the determination result, rather than directly return a connection rejection message. It may be determined whether to maintain the first-type service connection or establish the second-type service connection with the network device according to the service type. Thus, it can improve the flexibility and improve the service performance.

In another embodiment, determining whether to establish the second-type service connection with the network device according to the first-type service connection and the second-type service connection, includes: determining whether a priority of the second-type service connection is higher than a priority of the first-type service connection; and when the priority of the second-type service connection is higher than the priority of the first-type service connection, determining to establish the second-type service connection with the network device.

In another embodiment, determining whether to establish the second-type service connection with the network device according to the first-type service connection and the second-type service connection, includes: acquiring a preset type service connection for a local device; determining whether the first-type service connection and the second-type service connection match with the preset type service connection; and when the first-type service connection does not match with the preset type service connection and the second-type service connection matches with the preset type service connection, determining to establish the second-type service connection with the network device; or when the first-type service connection matches with the preset type service connection and the second-type service connection does not match with the preset type service connection, or when both of the first-type service connection and the second-type service connection match with the preset type service connection, determining to maintain the first-type service connection, and not to establish the second-type service connection with the network device.

In another embodiment, determining whether to establish the second-type service connection with the network device according to the first-type service connection and the second-type service connection, includes: acquiring a preset type service connection for a local device; determining whether the first-type service connection and the second-type service connection match with the preset type service connection; when neither the first-type service connection nor the second-type service connection matches with the preset type service connection, determining whether a priority of the second-type service connection is higher than a priority of the first-type service connection; and when the priority of the second-type service connection is higher than the priority of the first-type service connection, determining to establish the second-type service connection with the network device; or when the priority of the second-type service connection is not higher than the priority of the first-type service connection, determining to maintain the first-type service connection, and not to establish the second-type service connection with the network device.

In another embodiment, the connection request message at least includes a field of service type, the field of service type carrying a type of service connection to be established.

In another embodiment, the connection request message further includes a priority field, the priority field carrying a priority of a service type for which the service connection is to be established.

In another embodiment, responding according to the determination result includes: when determining to establish the second-type service connection with the network device, hanging up or disconnecting the first-type service connection and establishing the second-type service connection with the network device; and when determining not to establish the second-type service connection with the network device, sending a connection rejection message to the network device.

All of the above optional technical solutions may be combined in any manner to form other optical embodiments of the present disclosure, which will not be elaborated herein.

Figure 2:
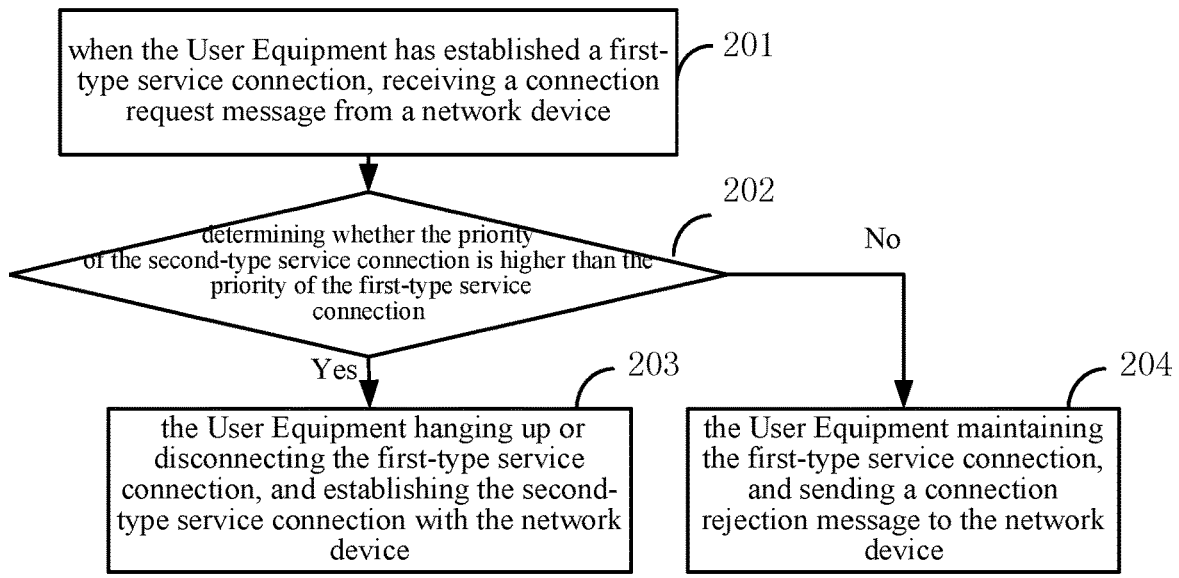
FIG. 2 is a flow chart illustrating a method for establishing service connection according to an exemplary embodiment.

FIG. 2 is a flow chart illustrating a method for establishing service connection according to an exemplary embodiment. In this embodiment, for example, the first-type service connection has a priority, and the second-type service connection has another priority. As shown in FIG. 2, the method for establishing service connection is applied in a User Equipment and includes the following steps.

At step 201, when the User Equipment has established a first-type service connection, a connection request message sent from a network device is received, the connection request message at least carrying a second-type service connection.

In the embodiment, the User Equipment may be a device such as a mobile phone, a personal computer, a device in an Internet of things or a terminal on a vehicle. The network device may be a base station, an MME (Mobility Management Entity), and the like, which the present embodiment does not limit.

When the User Equipment is in an idle state, if a connection request message sent from any network device is received, service connection may be established according to the connection request message. After the service connection is established, the User Equipment is in a busy state. Typically, when the User Equipment is in a busy state, if the User Equipment receives another connection request message sent from the network device, the User Equipment will maintain the established service connection, send a connection rejection message to the network device sending the current connection request message, and refuse to establish new service connection. However, if the current network service has a high requirement on immediacy, rejecting the establishment of the service connection will cause that the service cannot be handled timely, and the performance of the service may be influenced, and the needs of the user on the service cannot be satisfied, adversely affecting user experience.

Currently, the communication technology may provide various services, and different types of service may have different requirements on immediacy. For example, some services have a high requirement on immediacy, such as a voice service, and such a service requires service connection to be established quickly. Some services have a low requirement on immediacy, such as a data processing service, and such a service may be processed later.

Therefore, in order to improve the overall performance, in the present embodiment, a service type of the service may be added into the connection request message sent from the network device. When the User Equipment is in a busy state, the device may determine according to the type of the service whether to establish new service connection and to process the new service.

The present embodiment is applicable to a situation when the User Equipment has already established a first-type service connection. At this time, the network device sends a connection request message to the User Equipment, and the User Equipment receives the connection request message. In the embodiment, the connection request message at least carries a type of service connection to be established (i.e. the second-type service connection), and the connection request message indicates the User Equipment to establish the second-type service connection with the network device.

In the embodiment, the connection request message may be a Paging message, a data processing connection request message or other types of service connection request message, which the present embodiment does not limit.

For example, the connection request message at least includes a field of service type which carries the type of the service connection to be established. When the network device sends the connection request message, the network device may add the second-type service connection to the field of service type. The field of service type may occupy 2, 3 or more bits, which the present embodiment does not limit.

For example, for a typical Paging message contains two fields, ue-Identity and cn-Domain. The field ue-Identity represents an object that the network is calling, and the field cn-Domain represents which domain the calling network is in (a data domain or a circuit domain), specifically as follows.

```
message c1 : paging :
    {
    pagingRecordList
        {
            {
            ue-Identity s-TMSI :
                {
                mmec
                m-TMSI
                }
            cn-Domain
            }
        }
    }
```

In the present embodiment, a field ServiceType may be added into the Paging message to represent the type of the service, and the Paging message is as follows after adding the field:

```
message c1 : paging :
    {
    pagingRecordList
        {
            {
            ue-Identity s-TMSI :
                {
                mmec
                m-TMSI
                }
            en-Domain
            ServiceType
            }
        }
    }
```

In step 202, the User Equipment may determine whether the priority of the second-type service connection is higher than the priority of the first-type service connection. If the priority of the second-type service connection is higher than the priority of the first-type service connection, step 203 is performed. If the priority of the second-type service connection is not higher than the priority of the first-type service connection, step 204 is performed.

When a first-type service connection has been already established, after the connection request message is received, the User Equipment does not immediately send a connection rejection message to the network device, but determines whether the priority of the second-type service connection is higher than the priority of the first-type service connection, and determines whether to establish the second-type service connection with the network device according to the comparison result of the priorities.

Specifically, when the User Equipment establishes the first-type service connection, the User Equipment may record information regarding the first-type service connection. Then, when the connection request message is received later, it may be determined according to the historic record that the currently-established connected service type is the first-type service connection, and acquires the second-type service connection according to the connection request message. At this time, the priority of the first-type service connection and the priority of the second-type service connection may be determined, and it may be determined whether the priority of the second-type service connection is higher than the priority of the first-type service connection.

In the embodiment of the present disclosure, the higher the priority is, the higher the requirement of the service on immediacy is, and the service should be handled at higher priority. The lower the priority is, the lower the requirement of the service on immediacy is, and the service may be handled later. The User Equipment may determine an order of the priorities of various service types in advance, and may determine whether the priority of the second-type service connection is higher than the priority of the first-type service connection according to the preset priority order.

In the embodiment, for User Equipment of different types, the determined priority order may be the same, or may be different.

For example, for the following three service types: mMTC (massive Machine Type Communication), eMBB (enhanced Mobile Broad Band), URLLC (Ultra Reliable Low Latency Communication), a device in an Internet of things determines a priority order of the service types is mMTC>URLLC>eMBB, and a terminal on a vehicle determines a priority order of the service types is URLLC>eMBB>mMTC.

Alternatively, when there are too many service types, it may be difficult for the User Equipment to determine priority order of all of the service types. In this case, the network device may send the connection request message which carries a priority of the service type. Then, the User Equipment may directly determine the priority of the service type according to the received connection request message. After the service connection is established later, the priority of the service type may also be recorded. For example, the connection request message may carry a priority field which carries the priority of the service type for which service connection is to be established.

In this case, the connection request message carries the priority of the second-type service connection. When the User Equipment receives the connection request message, the User Equipment may acquire the priority of the second-type service connection, and acquire the priority of the first-type service connection from the historic record.

According to the priority of the first-type service connection and the priority of the second-type service connection, and User Equipment may determine whether the priority of the second-type service connection is higher than the priority of the first-type service connection.

For example, the User Equipment records that the priority of the first-type service connection is 3, and the connection request message carries the priority 4 of second-type service connection, it may be determined that the priority of the second-type service connection is higher than the priority of the first-type service connection.

In step 203, the User Equipment hangs up or disconnects the first-type service connection, and establishes the second-type service connection with the network device.

When the priority of the second-type service connection is higher than the priority of the first-type service connection, it means that the second-type service requires higher on immediacy, and the second-type service needs to be handled at higher priority. In this case, the User Equipment hangs up or disconnects the first-type service connection, and establishes the second-type service connection with the network device. When processing of the second-type service is completed, the first-type service connection may be resumed.

In step 204, the User Equipment maintains the first-type service connection, and sends a connection rejection message to the network device.

When the priority of the second-type service connection is not higher than the priority of the first-type service connection, it means that the second-type service does not require highly on immediacy, and the User Equipment does not need to handle the second-type service immediately. Thus, the User Equipment may send a connection rejection message to the network device. During this process, the User Equipment may maintain the first-type service connection, and keeps processing of the first-type service.

It should be noted that, in the present embodiment, the User Equipment receives one connection request message for example. In fact, the User Equipment may receive multiple connection request messages. In this case, the User Equipment may acquire a priority of the first-type service connection and priorities of the multiple types corresponding to the multiple connection request messages, and handle a service with the highest priority at top priority after comparison of the priorities. The specific process is similar to the above steps 202-204, which will not be elaborated herein.

In the method provided by the present embodiment, by carrying a service type in the connection request message, if a connection request message carrying the second-type service connection is received when a first-type service connection has been already established, the service with the higher priority is handled at higher priority by comparison of the priorities of the first-type service connection and the second-type service connection, rather than directly return a connection rejection message. It may be determined whether to maintain the first-type service connection or establish the second-type service connection according to the service type. Thus, it can improve the flexibility and improve the service performance. When the priority of the second-type service connection is higher, the new service can occupy resources of the currently handled service. Thereby, it can ensure that a service with a higher priority may use the resources at higher priority. Thereby, a service with a higher priority may be handled timely.

Figure 3:
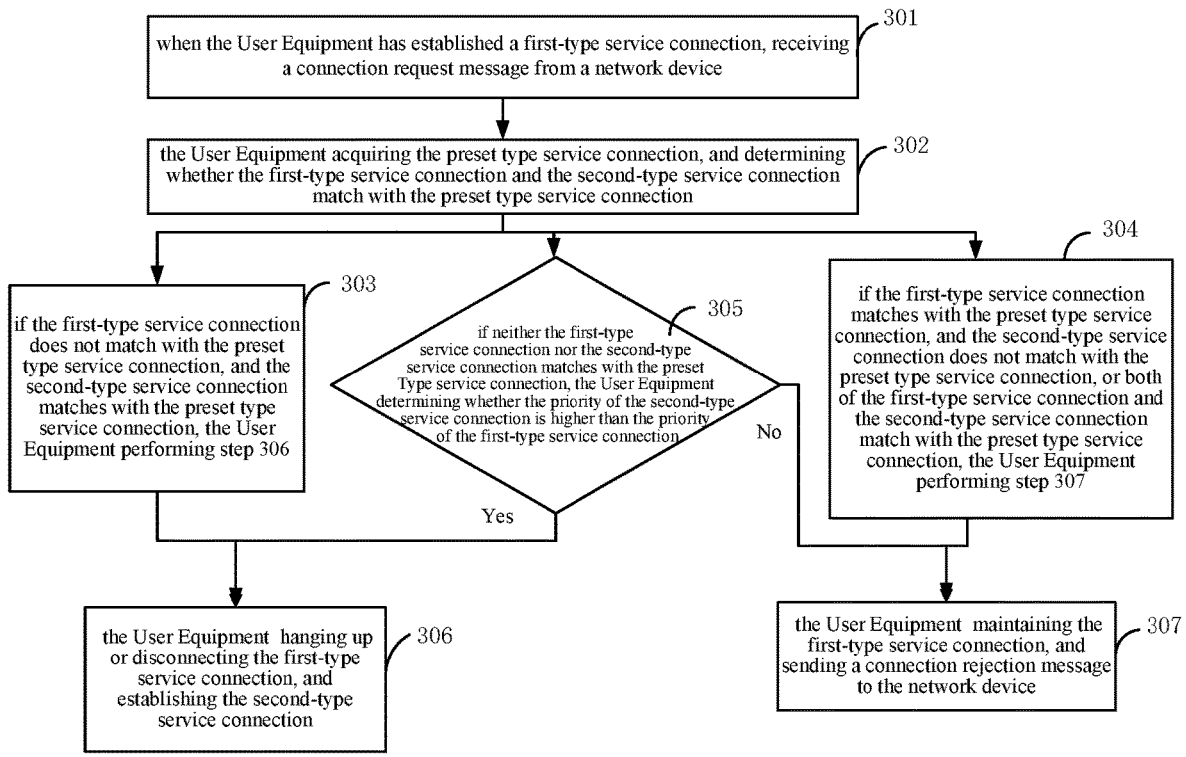
FIG. 3 is a flow chart illustrating a method for establishing service connection according to an exemplary embodiment.

FIG. 3 is a flow chart illustrating a method for establishing service connection according to an exemplary embodiment. In this embodiment, for example, the determination is made according to a preset type service connection of the User Equipment. As shown in FIG. 3, the method for establishing service connection is applied in a User Equipment and includes the following steps.

In step 301, when the User Equipment has already established a first-type service connection, a connection request message sent from the network device is received, the connection request message at least carrying a second-type service connection.

The step 301 is similar to the step 201, which will not be elaborated herein.

In step 302, the User Equipment acquires the preset type service connection, and determines whether the first-type service connection and the second-type service connection match with the preset type service connection.

Since different User Equipment handle different types of main services, for each User Equipment, the User Equipment may determine a preset type service connection according to the type of the main services that the User Equipment frequently handles, meaning that the User Equipment will handle the preset type service connection at top priority. For example, a device in an Internet of things may have a preset priority type mMTC, and the device will handle the mMTC service at top priority.

Thus, when the User Equipment has already established a first-type service connection, the User Equipment receives a connection request message carrying the second-type service connection, the User Equipment may determine whether the first-type service connection and the second-type service connection match with the preset type service connection, to determine whether to establish the second-type service connection with the network device.

In step 303, if the first-type service connection does not match with the preset type service connection, and the second-type service connection matches with the preset type service connection, the User Equipment performs step 306.

In step 304, if the first-type service connection matches with the preset type service connection, and the second-type service connection does not match with the preset type service connection, or if both of the first-type service connection and the second-type service connection match with the preset type service connection, the User Equipment performs step 307.

In step 305, if neither the first-type service connection nor the second-type service connection matches with the preset type service connection, the User Equipment determines whether the priority of the second-type service connection is higher than the priority of the first-type service connection. If the priority of the second-type service connection is higher than the priority of the first-type service connection, step 306 is performed, and if the priority of the second-type service connection is not higher than the priority of the first-type service connection, step 307 is performed.

In step 306, the User Equipment hangs up or disconnects the first-type service connection, and establishes the second-type service connection with the network device.

In step 307, the User Equipment maintains the first-type service connection, and sends a connection rejection message to the network device.

The User Equipment may handle a service connection of a type which matches with the preset type service connection at top priority. If the first-type service connection does not match with the preset type service connection, and the second-type service connection matches with the preset type service connection, the User Equipment may hang up or disconnect the first-type service connection and establishes the second-type service connection with the network device. If the first-type service connection matches with the preset type service connection, and the second-type service connection does not match with the preset type service connection, or, if both of the first-type service connection and the second-type service connection match with the preset type service connection, the User Equipment may maintain the first-type service connection, not establish the second-type service connection, and send a connection rejection message to the network device.

If neither the first-type service connection nor the second-type service connection matches with the preset type service connection, the service with a higher priority will be handled at higher priority. At this time, the User Equipment may determine whether the priority of the second-type service connection is higher than the priority of the first-type service connection, and determine whether to establish the second-type service connection with the network device according to the determination result. The specific process is similar to the above steps 202-204, which will not be elaborated herein.

In the method provided by the present embodiment, by carrying a service type in the connection request message, if a connection request message carrying the second-type service connection is received when a first-type service connection has been already established, the service matching with a preset type service connection, or with the higher priority is handled at higher priority, according to the priorities of the first-type service connection and the second-type service connection and preset type service connection of the User Equipment, rather than directly return a connection rejection message. It may be determined whether to maintain the first-type service connection or establish the second-type service connection with the network device according to the service type. Thus, it can improve the flexibility and improve the service performance.

Figure 4:
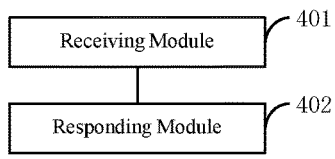
FIG. 4 is a block diagram illustrating a device for establishing service connection according to an exemplary embodiment.

FIG. 4 is a block diagram illustrating a device for establishing service connection according to an exemplary embodiment. As shown in FIG. 4, the device includes a receiving module 401 and a responding module 402.

The receiving module 401 is configured to, when a first-type service connection has been established, receive a connection request message sent from a network device, the connection request message indicating establishing a second-type service connection and the connection request message at least carrying the second-type service connection.

The responding module 402 is configured to determine whether to establish the second-type service connection according to the first-type service connection and the second-type service connection, and respond according to the determination result.

In the device provided by the embodiment of the present disclosure, by carrying a service type in the connection request message, if a connection request message carrying the second-type service connection is received when a first-type service connection has been already established, it is determined whether to establish the second-type service connection according to the first-type service connection and the second-type service connection, and the connection request message is responded according to the determination result, rather than directly return a connection rejection message. It may be determined whether to maintain the first-type service connection or establish the second-type service connection according to the service type. Thus, it can improve the flexibility and improve the service performance.

In another embodiment, the responding module 402 is configured to determine whether a priority of the second-type service connection is higher than a priority of the first-type service connection; and when the priority of the second-type service connection is higher than the priority of the first-type service connection, determine to establish the second-type service connection.

In another embodiment, the responding module 402 is configured to acquire a preset type service connection for the device; determine whether the first-type service connection and the second-type service connection match with the preset type service connection; when the first-type service connection does not match with the preset type service connection and the second-type service connection matches with the preset type service connection, determine to establish the second-type service connection; and when the first-type service connection matches with the preset type service connection, and the second-type service connection does not match with the preset type service connection, or, both of the first-type service connection and the second-type service connection match with the preset type service connection, determine to maintain the first-type service connection, and not to establish the second-type service connection.

In another embodiment, the responding module 402 is configured to acquire a preset type service connection for the device; determine whether the first-type service connection and the second-type service connection match with the preset type service connection; when neither the first-type service connection nor the second-type service connection matches with the preset type service connection, determine whether a priority of the second-type service connection is higher than a priority of the first-type service connection; when the priority of the second-type service connection is higher than the priority of the first-type service connection, determine to establish the second-type service connection; and when the priority of the second-type service connection is not higher than the priority of the first-type service connection, determine to maintain the first-type service connection, and not to establish the second-type service connection.

In another embodiment, the connection request message at least includes a field of service type, the field of service type carrying a type of service connection to be established.

In another embodiment, the connection request message further includes a priority field, the priority field carrying a priority of a service type for which the service connection is to be established.

In another embodiment, the responding module 402 is configured to, when determining to establish the second-type service connection, hang up or disconnect the first-type service connection and establish the second-type service connection; and when determining not to establish the second-type service connection, send a connection rejection message to the network device.

All of the above optional technical solutions may be combined in any manner to form other optical embodiments of the present disclosure, which will not be elaborated herein.

With respect to the devices in the above embodiments, the specific manners for performing operations for individual modules therein have been described in detail in the embodiments regarding the related methods, which will not be elaborated herein.

It should be noted that, the process of establishing service connection performed by the device for establishing service connection provided by the above-described embodiments, is only illustrated by example of functional modules as above mentioned. While in practice, the above functions may be performed by different modules as desired, that is, the internal structure of the User Equipment may be divided into different functional modules, so as to achieve all or a part of the functions described above. In addition, the device and the method for establishing service connection provided by the above-described embodiments belong to the same conception, therefore, the detailed implementing process of the device may refer to the embodiments of the method, and the detailed description thereof is not repeated herein.

Figure 5:
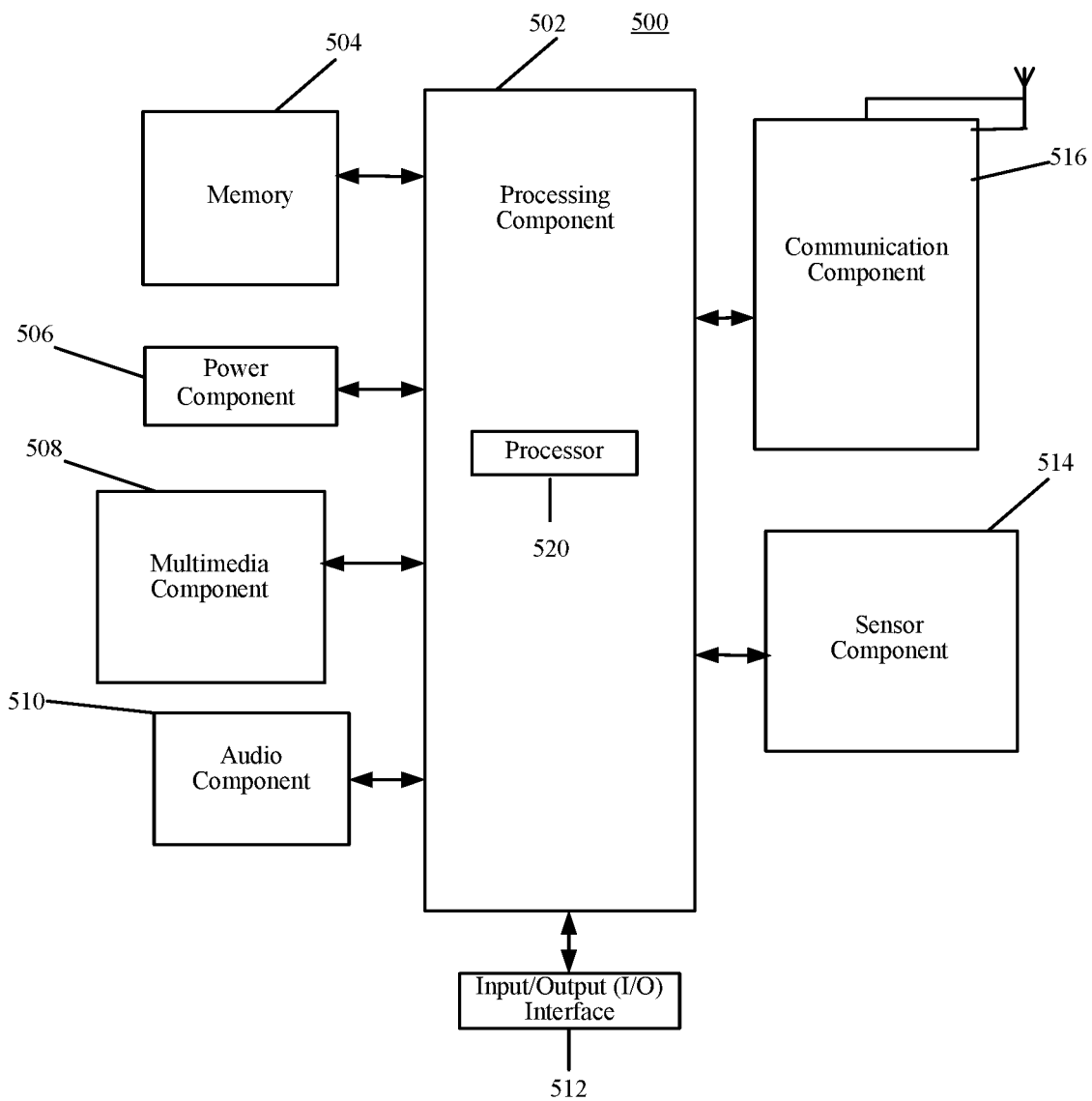
FIG. 5 is a block diagram illustrating a device for establishing service connection according to an exemplary embodiment.

FIG. 5 is a block diagram illustrating a device 500 for establishing service connection according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 can include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 can include one or more processors 520 to execute instructions to perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 can include a power management system, one or more power sources, and any other components associated with the generation, management, and distribution of power in the device 500.

The multimedia component 508 includes a screen providing an output interface between the device 500 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 508 includes a front camera and/or a rear camera. The front camera and/or the rear camera can receive an external multimedia datum while the device 500 is in an operation mode, such as a photographing mode or a video mode. Each of the front camera and the rear camera can be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button.

The sensor component 514 includes one or more sensors to provide status assessments of various aspects of the device 500. For instance, the sensor component 514 can detect an open/closed status of the device 500, relative positioning of components, e.g., the display and the keypad of the device 500. The sensor component 514 can also detect a change in position of the device 500 or a component of the device 500, a presence or absence of user contact with the device 500, an orientation or an acceleration/deceleration of the device 500, and a change in temperature of the device 500. The sensor component 514 can include a proximity sensor configured to detect the presence of nearby objects without any physical contact. The sensor component 514 can also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2Q or 3Q or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for establishing service connection.

In exemplary embodiments, there is also provided a non-transitory computer-readable storage medium including instructions, such as included in the memory 504, executable by the processor 520 in the device 500, for performing the above-described methods. For example, the non-transitory computer-readable storage medium can be a ROM, a RAM, a CD-ROM, a magnetic tape, a floppy disc, an optical data storage device, and the like.

A non-transitory computer-readable storage medium, when instructions in the storage medium are executed by a processor of a mobile terminal, the mobile terminal is caused to perform a method for establishing service connection, the method includes:

when a first-type service connection has been established, receiving a connection request message sent from a network device, the connection request message carrying a second-type service connection; and determining whether to establish the second-type service connection according to the first-type service connection and the second-type service connection, and responding according to the determination result.

In another embodiment, determining whether to establish the second-type service connection according to the first-type service connection and the second-type service connection, includes: determining whether a priority of the second-type service connection is higher than a priority of the first-type service connection; and when the priority of the second-type service connection is higher than the priority of the first-type service connection, determining to establish the second-type service connection.

In another embodiment, determining whether to establish the second-type service connection according to the first-type service connection and the second-type service connection, includes: acquiring a preset type service connection for a local device; determining whether the first-type service connection and the second-type service connection match with the preset type service connection; when the first-type service connection does not match with the preset type service connection and the second-type service connection matches with the preset type service connection, determining to establish the second-type service connection; and when the first-type service connection matches with the preset type service connection, and the second-type service connection does not match with the preset type service connection, or, both of the first-type service connection and the second-type service connection match with the preset type service connection, determining to maintain the first-type service connection, and not to establish the second-type service connection.

In another embodiment, determining whether to establish the second-type service connection according to the first-type service connection and the second-type service connection, includes: acquiring a preset type service connection for a local device; determining whether the first-type service connection and the second-type service connection match with the preset type service connection; when neither the first-type service connection nor the second-type service connection matches with the preset type service connection, determining whether a priority of the second-type service connection is higher than a priority of the first-type service connection; when the priority of the second-type service connection is higher than the priority of the first-type service connection, determining to establish the second-type service connection; and when the priority of the second-type service connection is not higher than the priority of the first-type service connection, determining to maintain the first-type service connection, and not to establish the second-type service connection.

In another embodiment, the connection request message at least includes a field of service type, the field of service type carrying a type of service connection to be established.

In another embodiment, the connection request message further includes a priority field, the priority field carrying a priority of a service type for which the service connection is to be established.

In another embodiment, responding according to the determination result includes: when determining to establish the second-type service connection, hanging up or disconnecting the first-type service connection and establishing the second-type service connection; and when determining not to establish the second-type service connection, sending a connection rejection message to the network device.

All of the above optional technical solutions may be combined in any manner to form other optical embodiments of the present disclosure, which will not be elaborated herein.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for establishing service connection, the method comprising:

receiving a connection request message sent from a network device when a first-type service connection has been established, the connection request message carrying a second-type service connection, wherein each of the first-type service connection and the second-type service connection has a configurable priority based on a preset type service connection;

determining whether to establish the second-type service connection with the network device according to the first-type service connection and the second-type service connection by:

acquiring the preset type service connection for a local device;

determining whether the first-type service connection and the second-type service connection match with the preset type service connection; and determining to establish the second-type service connection with the network device when the first-type service connection does not match with the preset type service connection and the second-type service connection matches with the preset type service connection; or determining to maintain the first-type service connection and not to establish the second-type service connection with the network device, when the first-type service connection matches with the preset type service connection and the second-type service connection does not match with the preset type service connection, or when both of the first-type service connection and the second-type service connection match with the preset type service connection; and responding according to the determination result.

2. The method of claim 1, wherein determining whether to establish the second-type service connection with the network device according to the first-type service connection and the second-type service connection, comprises:
- determining whether a priority of the second-type service connection is higher than a priority of the first-type service connection; and
- determining to establish the second-type service connection with the network device when the priority of the second-type service connection is higher than the priority of the first-type service connection.

3. The method of claim 1, wherein determining whether to establish the second-type service connection with the network device according to the first-type service connection and the second-type service connection, comprises:
- acquiring a preset type service connection for a local device;
- determining whether the first-type service connection and the second-type service connection match with the preset type service connection;
- determining whether a priority of the second-type service connection is higher than a priority of the first-type service connection when neither the first-type service connection nor the second-type service connection matches with the preset type service connection; and
- determining to establish the second-type service connection with the network device when the priority of the second-type service connection is higher than the priority of the first-type service connection; or
- determining to maintain the first-type service connection and not to establish the second-type service connection with the network device when the priority of the second-type service connection is not higher than the priority of the first-type service connection.

4. The method of claim 1, wherein the connection request message at least comprises a field of service type, the field of service type carrying a type of service connection to be established.

5. The method of claim 4, wherein the connection request message further comprises a priority field, the priority field carrying a priority of a service type for which the service connection is to be established.

6. The method of claim 1, wherein responding according to the determination result comprises:
- hanging up or disconnecting the first-type service connection and establishing the second-type service connection with the network device when determining to establish the second-type service connection with the network device; and
- sending a connection rejection message to the network device when determining not to establish the second-type service connection with the network device.

7. A device for establishing service connection, comprising:
- a processor; and
- a memory for storing instructions executable by the processor;
- wherein the processor is configured to perform:
- receiving a connection request message sent from a network device when a first-type service connection has been established, the connection request message carrying a second-type service connection, wherein each of the first-type service connection and the second-type service connection has a configurable priority based on a preset type service connection;
- determining whether to establish the second-type service connection with the network device according to the first-type service connection and the second-type service connection by:
- acquiring the preset type service connection for a local device;
- determining whether the first-type service connection and the second-type service connection match with the preset type service connection; and
- determining to establish the second-type service connection with the network device when the first-type service connection does not match with the preset type service connection and the second-type service connection matches with the preset type service connection; or
- determining to maintain the first-type service connection and not to establish the second-type service connection with the network device, when the first-type service connection matches with the preset type service connection and the second-type service connection does not match with the preset type service connection, or when both of the first-type service connection and the second-type service connection match with the preset type service connection; and
- responding according to the determination result.

8. The device of claim 7, wherein determining whether to establish the second-type service connection with the network device according to the first-type service connection and the second-type service connection, comprises:
- determining whether a priority of the second-type service connection is higher than a priority of the first-type service connection; and
- determining to establish the second-type service connection with the network device when the priority of the second-type service connection is higher than the priority of the first-type service connection.

9. The device of claim 7, wherein determining whether to establish the second-type service connection with the network device according to the first-type service connection and the second-type service connection, comprises:
- acquiring a preset type service connection for the device;
- determining whether the first-type service connection and the second-type service connection match with the preset type service connection;
- determining whether a priority of the second-type service connection is higher than a priority of the first-type service connection when neither the first-type service connection nor the second-type service connection matches with the preset type service connection; and
- determining to establish the second-type service connection with the network device when the priority of the second-type service connection is higher than the priority of the first-type service connection; or
- determining to maintain the first-type service connection, and not to establish the second-type service connection with the network device when the priority of the second-type service connection is not higher than the priority of the first-type service connection.

10. The device of claim 7, wherein the connection request message at least comprises a field of service type, the field of service type carrying a type of service connection to be established.

11. The device of claim 10, wherein the connection request message further comprises a priority field, the priority field carrying a priority of a service type for which the service connection is to be established.

12. The device of claim 7, wherein responding according to the determination result comprises:
- hanging up or disconnecting the first-type service connection and establishing the second-type service connection with the network device when determining to establish the second-type service connection with the network device; and
- sending a connection rejection message to the network device when determining not to establish the second-type service connection with the network device.

13. A non-transitory computer-readable storage medium having stored therein instructions that, when executed by a processor of a device, causes the device to perform a method for establishing service connection, the method comprising:
- receiving a connection request message sent from a network device when a first-type service connection has been established, the connection request message carrying a second-type service connection, wherein each of the first-type service connection and the second-type service connection has a configurable priority based on a preset type service connection;
- determining whether to establish the second-type service connection with the network device according to the first-type service connection and the second-type service connection by:
  - acquiring the preset type service connection for a local device;
  - determining whether the first-type service connection and the second-type service connection match with the preset type service connection; and
  - determining to establish the second-type service connection with the network device when the first-type service connection does not match with the preset type service connection and the second-type service connection matches with the preset type service connection; or
  - determining to maintain the first-type service connection and not to establish the second-type service connection with the network device, when the first-type service connection matches with the preset type service connection and the second-type service connection does not match with the preset type service connection, or when both of the first-type service connection and the second-type service connection match with the preset type service connection; and
- responding according to the determination result.

14. The non-transitory computer-readable storage medium of claim 13, wherein determining whether to establish the second-type service connection with the network device according to the first-type service connection and the second-type service connection, comprises:
- determining whether a priority of the second-type service connection is higher than a priority of the first-type service connection; and
- determining to establish the second-type service connection with the network device when the priority of the second-type service connection is higher than the priority of the first-type service connection.

15. The non-transitory computer-readable storage medium of claim 13, wherein determining whether to establish the second-type service connection with the network device according to the first-type service connection and the second-type service connection, comprises:
- acquiring a preset type service connection for the device;
- determining whether the first-type service connection and the second-type service connection match with the preset type service connection;
- determining whether a priority of the second-type service connection is higher than a priority of the first-type service connection when neither the first-type service connection nor the second-type service connection matches with the preset type service connection; and
- determining to establish the second-type service connection with the network device when the priority of the second-type service connection is higher than the priority of the first-type service connection; or
- determining to maintain the first-type service connection, and not to establish the second-type service connection with the network device when the priority of the second-type service connection is not higher than the priority of the first-type service connection.

16. The non-transitory computer-readable storage medium of claim 13, wherein the connection request message at least comprises a field of service type, the field of service type carrying a type of service connection to be established.

17. The non-transitory computer-readable storage medium of claim 16, wherein the connection request message further comprises a priority field, the priority field carrying a priority of a service type for which the service connection is to be established.

* * * * *